R. E. HELLMUND.
SYSTEM OF CONTROL.
APPLICATION FILED APR. 29, 1915.

1,287,015.

Patented Dec. 10, 1918.
4 SHEETS—SHEET 1.

WITNESSES:
C. Fornander
D. C. Davis

INVENTOR
Rudolf E. Hellmund.
BY
Wesley G. Carr
ATTORNEY

R. E. HELLMUND.
SYSTEM OF CONTROL.
APPLICATION FILED APR. 29, 1915.

1,287,015.

Patented Dec. 10, 1918.
4 SHEETS—SHEET 2.

WITNESSES:

INVENTOR
Rudolf E. Hellmund.
BY
ATTORNEY

R. E. HELLMUND.
SYSTEM OF CONTROL.
APPLICATION FILED APR. 29, 1915.

1,287,015.

Patented Dec. 10, 1918.
4 SHEETS—SHEET 3.

WITNESSES:
C. Fornander
D. C. Davis

INVENTOR
Rudolf E. Hellmund.
BY
Wesley G. Carr
ATTORNEY

R. E. HELLMUND.
SYSTEM OF CONTROL.
APPLICATION FILED APR. 29, 1915.

1,287,015.

Patented Dec. 10, 1918.
4 SHEETS—SHEET 4.

WITNESSES:

INVENTOR
Rudolf E. Hellmund.
BY
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,287,015.  Specification of Letters Patent.  Patented Dec. 10, 1918.

Application filed April 29, 1915. Serial No. 24,737.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Systems of Control, of which the following is a specification.

My invention relates to alternating-current dynamo-electric machines of the commutating type, and it has for its object to provide means whereby sparking at the commutator, in machines of the character specified, may be substantially eliminated under all conditions of speed and load, both when the machine is operating as a motor and when it is regenerating to supply power to the source or to provide a braking effect.

In the operation of a compensated commutating motor, conditions are frequently such that the strength or phase relation of the current in the cross field winding is not of a proper value to compensate for the reactance and transformer voltages in the armature coils undergoing commutation and, under these conditions, it is desirable that adjustment of said exciting current be obtained in order to prevent harmful sparking at the commutator. By my invention, I am enabled to perform this operation in a variety of ways, each of which is simple and effective in operation.

Figure 1:
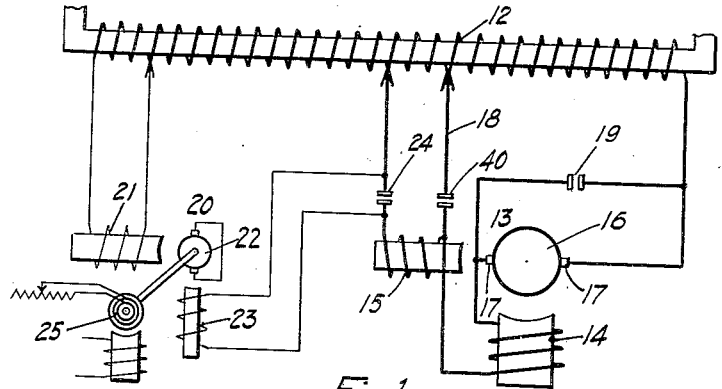
Figure 2:
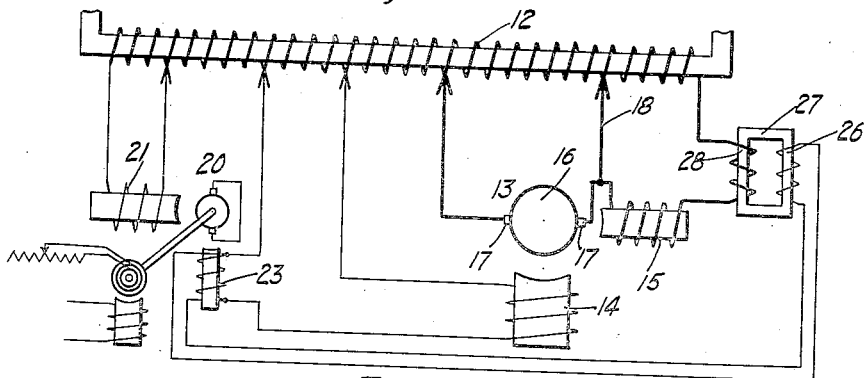

Referring to the accompanying drawing, Figure 1 is a diagrammatic view of a motor of the compensated commutating type and its attendant supply circuit and cross-field varying means; and Figs. 2 to 11, inclusive, are diagrammatic views of modifications of the system shown in Fig. 1.

In the form of my invention shown in Fig. 1, a source of alternating current, such, for example, as the secondary winding 12 of a transformer is provided with a plurality of voltage taps. An alternating-current machine 13 of the compensated commutating type is provided with a main field winding 14, a cross field winding 15 and an armature 16, upon the commutator of which bear brushes 17. With the connections shown, the machine 13 operates as a doubly-fed motor from the source 12, when the switches 24 and 40 are closed, because the armature and main field winding are connected in series relation on one side of an intermediate connection 18 and the cross field winding 15 is connected on the other side thereof. A suitable switch 19 is provided to short circuit the brushes 17, whereby the motor may be started as a repulsion machine and a similar switch 40 is provided for opening the intermediate tap 18 of the double-feed connection for series operation. With any of the connections thus described, the cross field provided by current from the source 12 alone is not in exactly the correct phase relation to properly compensate for both the transformer and reactance voltage of the armature coils undergoing commutation by the brushes 17. I therefore provide an auxiliary source of electromotive force 20, such, for example, as a phase converter of the short circuited armature commutator type. The machine 20 is provided with a main field winding 21, a short circuited armature 22 and a cross field winding 23 which may be connected in series with the cross field winding 15 by opening a suitable switch 24. The armature 22 may be driven at any desired speed by any convenient prime mover, such, for example, as a variable-speed induction motor 25. The winding 21, when properly excited, as by connection to the source 12, will induce currents in the armature 22, said currents will freely circulate through the short circuit connections thereof and will induce currents in the winding 23 which will bear a definite phase relation to the current flowing in the winding 21. As the windings 21 and 15 are connected to the same source 12, the voltages supplied thereto from said source will be in phase with each other and, since the voltage induced in the winding 23 differs in phase from that impressed upon the winding 21, the voltage induced in the winding 23 will differ in phase from that impressed upon the winding 15. As the winding 15, however, is connected in series relation with two sources of electromotive force which differ from each other by a definite phase angle, the resultant voltage impressed upon said winding will be the resultant voltage obtained by the vectorial addition of the two exciting voltages. By varying the voltage impressed upon the winding 21, the voltage induced in the winding 23 may be adjusted and, by shifting the brushes bearing upon the commutator of the armature 22, the phase relation between the voltages of the windings 21 and 23 and, consequently, between the source 12 and the winding 23 may be adjusted to any desired amount. The field or inducing winding 23 of the auxiliary machine 20 may be connected in series with the field winding 15 by opening the switch 24. Accordingly, the resultant voltage impressed upon the coil 15 may be varied both in magnitude and phase relation with respect to the source 12 by adjustment of either the phase or the magnitude of one of the components thereof and good commutating conditions may thereby be obtained for the brushes 17 under all conditions of speed and load.

It frequently occurs that the circumstances favoring the use of motors of the compensated series commutating type, in railway circuits for example, would not be sufficiently weighty to warrant the expense of an auxiliary phase converting machine for the purpose of improving the commutation. It is frequently desirable, however, to provide railway vehicles with an auxiliary phase converter for the purpose of exciting the main field windings during regeneration. Under these conditions, a circuit like that shown in Fig. 2 may be used with advantage. A motor 13 of the compensated commutating type is supplied with energy from a source 12 and is provided with a main field winding 14, a cross field winding 15 and an armature 16 to which current is supplied by means of brushes 17. A phase converter 20 supplies current of any desired voltage and phase relation to the winding 14 during the process of regeneration. Suitable connections from the cross field winding 23 of the machine 20 lead to the primary winding 26 of a transformer 27 provided with a secondary winding 28 connected in series relation with the cross field winding 15 of the machine 13. Under these conditions, the electromotive force generated in the winding 23, differing by a definite phase angle from that of the source 12, will set up a corresponding electromotive force in the coil 28 which will combine vectorially with the voltage of a portion of the source 12 to impress a resultant voltage upon the winding 15 which will be of such magnitude and phase relation as to enable the field of the latter to properly compensate in the commutating zone of the brushes 17.

Figure 3:
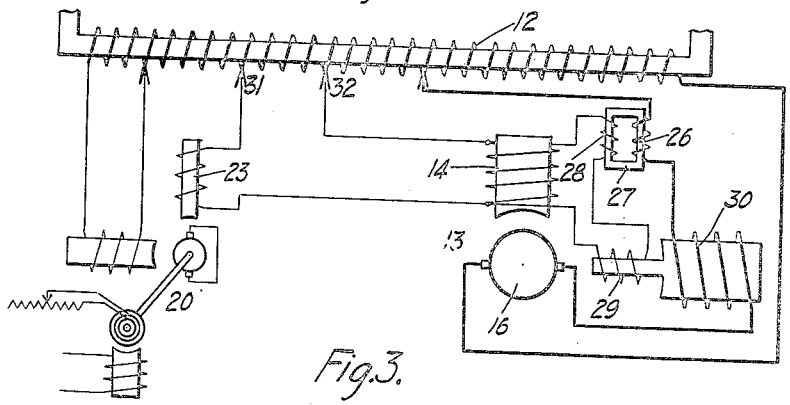

In the circuit shown in Fig. 3, the cross field winding 23 of the machine 20 is shown as supplying the main field winding 14 and an interpole winding 29 of the machine 13 in parallel relation. The machine 13, in addition to being provided with the interpole winding 29 is provided with a compensating winding 30 which is connected in series with the armature 16 and with the primary winding 26 of a transformer 27, the secondary winding 28 of which is connected in series with the interpole winding 29. Under these conditions, the resultant voltage impressed upon the interpole winding 29 will be made up by the vectorial addition of the electromotive forces supplied by the winding 23, the winding 28 and the portion of the source 12 included between the points 31 and 32. As the current flowing in the winding 26 varies with the load of the motor, the current supplied by the winding 28 will vary with the load and exert a beneficial action on the commutation of the machine 13.

Figure 4:
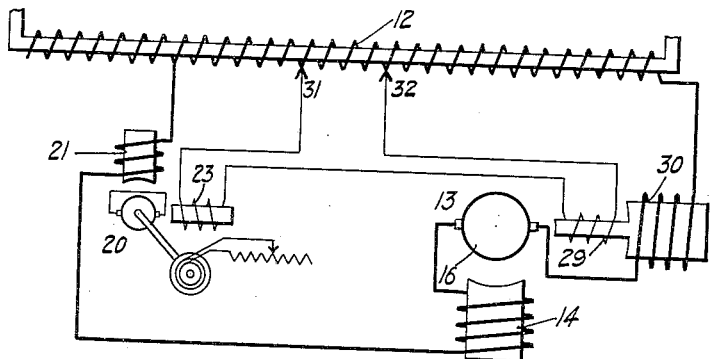

It is frequently necessary to make the interpole voltage more directly proportional to the motor load than is the case in the circuit of Fig. 3, and I may attain this result by the circuit shown in Fig. 4. The machine 13 is provided with an interpole winding 29 and with a compensating winding 30, in addition to the main field winding 14 and the armature winding 16. The compensating winding 30, the armature winding 16, the main field winding 14 and the main field winding 21 of a phase converter 20 are all connected in series relation across a portion of a source 12. The cross-field winding 23 of the phase converter is connected in series with a portion of the source 12 to supply energy to the interpole winding 29. With these connections, as the current in the main field winding 21 of the phase converter 20 varies with the load on the motor, the voltage induced by said converter will vary in proportion, and, accordingly, the resultant electromotive force impressed upon the interpole winding 29, which is the vector sum of the electromotive forces of the winding 23 and of a portion of the source 12, will be radically modified with changes of load and, by proper design, may be caused to properly compensate for the armature voltages in the commutating zone of the machine 13. A convenient and preferred method of varying the voltage and phase of the electromotive force impressed upon the interpole winding 29 is by the adjustment of the taps 31 and 32 of the source 12.

Figure 5:
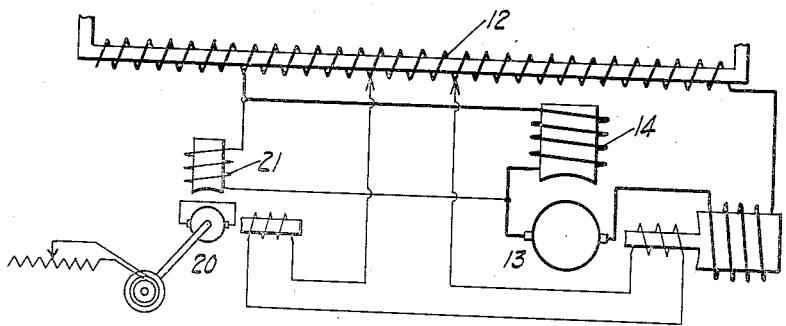

Equally good results may be obtained by connecting the main field winding 14 of the machine 13 in parallel relation with the main field winding 21 of the phase converter 20, as illustrated in Fig. 5.

Figure 6:
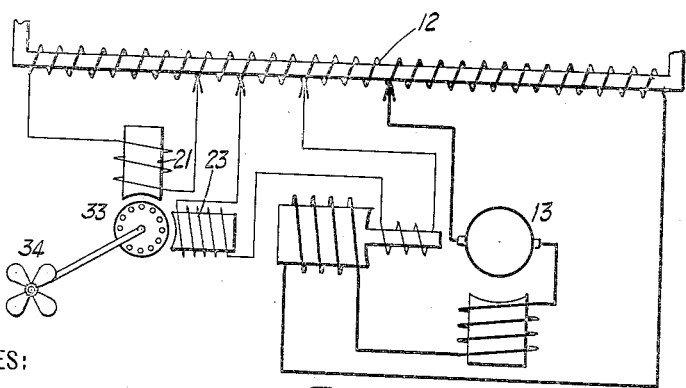

The circuit shown in Fig. 6 is quite similar to those shown in the preceding circuits, with the exception that a phase converter 33 of the induction type is employed instead of the phase converter 20 of the repulsion type previously illustrated. A fan 34 may conveniently be driven by the induction phase converter 33 and be employed to supply forced ventilation to the main motor 13 or for other purposes.

Figure 7:
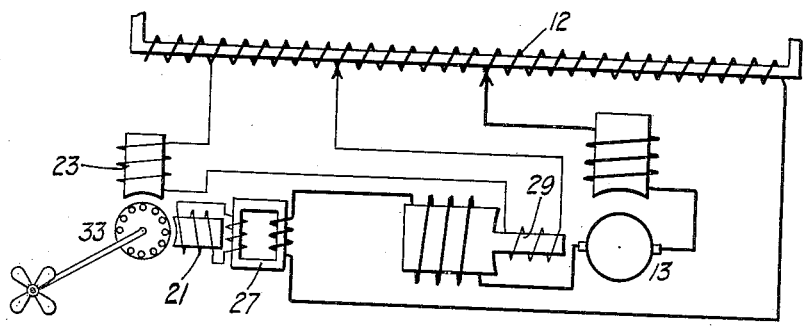

The circuit of Fig. 7 is similar to that of Fig. 6, with the exception that the main field winding 21 of the phase converter 33 is connected in series relation with the armature winding of the machine 13 through the instrumentality of a transformer 27 and, accordingly, the current therein varies with the load current, and the voltage induced in the cross field winding 23 will vary in a like manner, serving to vary the voltage applied to the interpole winding 29 in accordance with the load.

Figure 8:
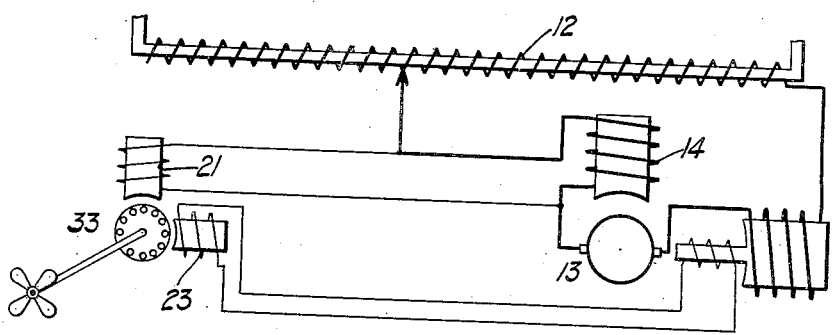

Fig. 8 shows an arrangement similar to that of Fig. 7 with the exception that the main field winding 21 of the phase converter 33 is connected in parallel with the main field winding 14 of the motor 13, as is the case in the circuit of Fig. 5.

It is frequently desirable, in order to obtain good commutation at the main motor, to vary the interpole strength when either the load current or the speed of the main motor varies. I accomplish this result by the circuit shown in Fig. 9. The main field winding 14, the armature winding 16, and the compensating winding 30 of the machine 13 are connected in series relation with the primary winding 26 of a transformer 27 between the right hand end of the source 12 and an adjustable voltage tap 37. The secondary winding 28 of the transformer 27 serves to energize the main field winding 21 of the phase converter 30, the cross-field winding 23 of which excites the interpole winding 29 of the motor 13. Upon an increase in load current, the voltage of the winding 23, and, accordingly, of the winding 29, will be increased. The phase converter 20 is driven by an alternating-current motor 36 of the series commutating type, connected between the left hand end of the source 12 and a terminal of the compensating field winding 30 which is virtually at the potential of the tap 37 because the drop in the primary winding of the transformer 27 is usually quite small. When the transformer tap 37 is moved to the left to increase the voltage supplied to the motor 13, the voltage supplied to the driving motor 36 will be decreased, the speed of the motor 36 and of the phase converter 20 will be lowered in accordance therewith, and the voltage supplied to the interpole winding 29 will be decreased, as is desirable under the conditions of increased main motor voltage.

Figure 9:
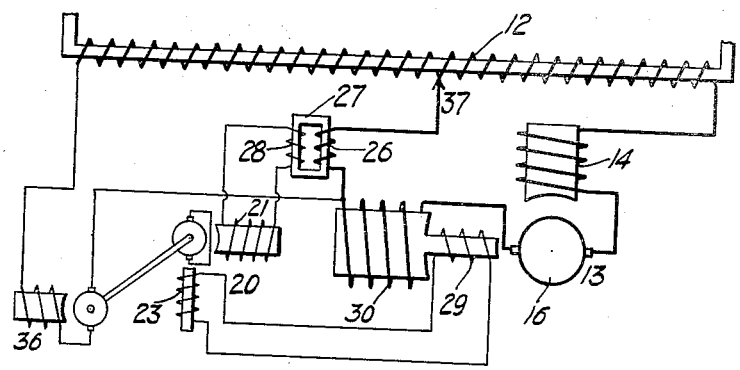
Figure 10:
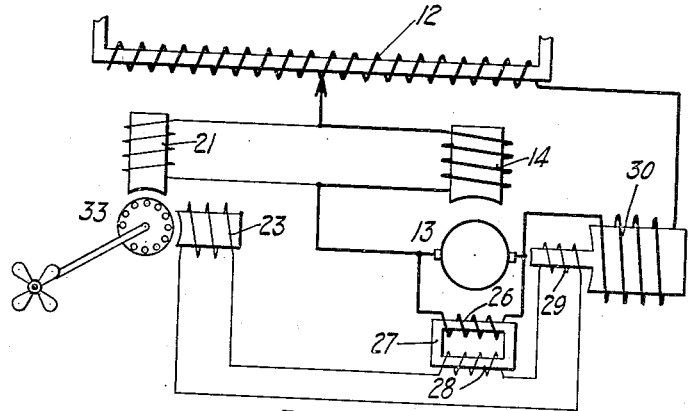

The circuit of Fig. 10 accomplishes the same result as that of Fig. 9. The main field winding 21 of the induction phase converter 33 is connected in parallel to the main field winding 14 of the main motor 13, and the cross field winding 23 of the phase converter is connected to energize the interpole winding 29 of the machine 13. The primary winding 26 of a transformer 27 is connected across the brushes of the machine 13, and the secondary winding 28 thereof is connected in opposition to the cross field winding 23 of the phase converter 33. Under these conditions, an increase in the motor load current will raise the voltage induced in the winding 23 and accordingly increase the excitation of the interpole winding 29. An increase in the voltage applied to the motor 13 will increase the voltage applied to the primary winding 26, increasing the voltage induced in the winding 28 which will therefore more nearly neutralize the voltage of the winding 23 and decrease the resultant electromotive force at the interpole winding 29.

Figure 11:
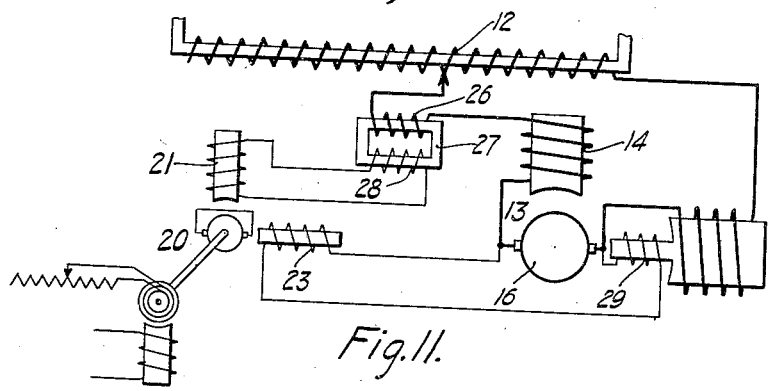

In the circuit of Fig. 11, the main field winding 14 of the motor 13 is connected, through the primary winding 26 of a transformer 27, to a source 12. The secondary winding 28 of the transformer 27 energizes the main field winding 21 of a phase converter 20 of the commutating repulsion type. The cross-field winding 23 of the phase converter 20 is connected in circuit with the armature 16 of the machine 13 so that the voltages thereof oppose each other and, under normal conditions, the voltage of the winding 23 is higher than that of the armature 16. The interpole winding 29 is connected in this circuit and, hence, is subjected to the differential voltage. Upon an increase in the voltage applied to the motor 13, the voltage across the armature 16 will rise, the voltage of the winding 23 will be more nearly neutralized, and the resultant electromotive force applied to the interpole winding 29 will be reduced, as is desirable under such circumstances.

While I have shown my invention in several distinct modifications, it is obvious to those skilled in the art that it is susceptible of various additional minor changes and modifications without departing from the spirit thereof, and I desire, therefore, that no restrictions shall be placed thereupon except such as are imposed by the prior art or specifically set forth in the appended claims.

I claim as my invention:

1. The combination with a source of alternating current, of an alternating-current motor of the commutator type connected thereto, said motor being provided with both main and cross-field windings, each of which is connected in shunt relation to a portion of said source, an auxiliary exciting machine, and means whereby said exciting machine modifies the phase of the excitation of said field windings by different amounts of electromotive force.

2. The combination with a source of alternating current, of an alternating-current motor of the commutator type connected thereto, said motor being provided with both main and cross-field windings, each of which is connected in shunt relation to a portion of said source, an auxiliary phase-converter deriving excitation from said source and supplying an electromotive force displaced in phase from the electromotive force of said source, and means for supplying said displaced electromotive force to each of said field windings for the modification of the excitation thereof.

3. The combination with a source of alternating current, of an alternating-current motor of the commutator type connected thereto, said motor being provided with both main and cross-field windings each of which is connected in shunt relation to a portion of said source for providing the major portion of the excitation thereof, an auxiliary phase-converter deriving excitation from said source and supplying an electromotive force displaced in phase from the electromotive force of said source, and means for supplying said displaced electromotive force to each of said field windings for supplying a minor portion of the excitation of each of said field windings.

4. The combination with a source of alternating current, of an alternating-current motor of the commutator type having two different circuits connected to said source and provided with an armature winding and a cross-field winding included in the respective circuits, an auxiliary dynamo-electric machine for supplying a minor portion of electromotive force, displaced with respect to that of the source, to the circuit including the cross-field winding for the purpose of modifying the resultant impressed electromotive force of the field winding, while the conductively impressed electromotive force of the circuit including the armature winding is supplied exclusively by said source.

5. The combination with a source of alternating current, of an alternating-current motor of the commutator type having two different circuits connected to said source and provided with an armature winding and a cross-field winding included in the respective circuits, an auxiliary dynamo-electric machine for supplying a minor portion of electromotive force, displaced with respect to that of the source, to only one of the said two circuits for the purpose of modifying the resultant impressed electromotive force of the motor winding included in this circuit.

6. The combination with a source of alternating current, of an alternating-current motor of the commutator type provided with an armature-winding circuit and a cross-field-winding circuit, the two circuits being separately arranged in shunt relation to the source, whereby an electromotive force in phase with said source is impressed upon both of said circuits, and auxiliary means adding to the conductively impressed electromotive force of one of said two circuits, an out-of-phase electromotive force larger than that added to the other of said circuits.

In testimony whereof, I have hereunto subscribed my name this 27th day of April 1915.

RUDOLF E. HELLMUND.